March 5, 1968 B. WEINGARTNER 3,372,235

HIGH FREQUENCY CIRCUIT ARRANGEMENT FOR CAPACITIVE TRANSDUCER

Filed May 18, 1964

INVENTOR.
BERNHARD WEINGARTNER
BY
Frank R. Jeufari
AGENT

United States Patent Office 3,372,235

Patented Mar. 5, 1968

3,372,235

HIGH FREQUENCY CIRCUIT ARRANGEMENT FOR CAPACITIVE TRANSDUCER

Bernhard Weingartner, Vienna, Austria, assignor to Akustische U. Kino-Gerate Gesellschaft m.b.H., Vienna, Austria, a firm Filed May 18, 1964, Ser. No. 368,104
Claims priority, application Austria, May 20, 1963, A 4,073/63
6 Claims. (Cl. 179—1)

ABSTRACT OF THE DISCLOSURE

A high frequency electrostatic microphone circuit comprises a transformer having a center tapped secondary winding connected in circuit with a capacitor microphone and a fixed capacitor to form a bridge circuit. The transformer primary winding is connected to the output of a high frequency oscillator. An inductor is connected between the secondary center tap and the junction of the microphone and capacitor. The circuit also includes a demodulating network comprising a pair of oppositely poled diodes, an output transformer having a primary winding in two sections, and the parallel combination of a resistor and capacitor. These elements are connected together to form two series circuits, each including the inductor, across the center tapped secondary winding. The capacitor is chosen so that the parallel R-C circuit exhibits a low impedance to audio frequency signals.

Figure 1:
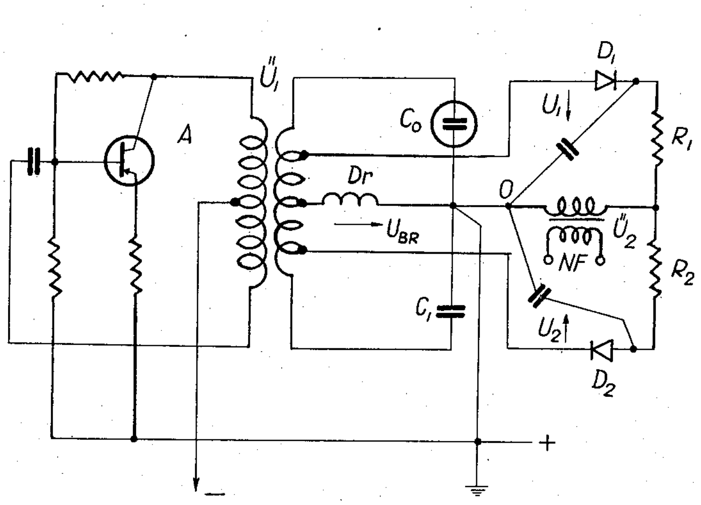

This invention relates to a circuit arrangement for electro-acoustic transducers of the electrostatic type, more particularly condenser microphones.

The known circuit arrangements may be divided into two groups. In one group, the capacitive transducer is given a predetermined, constant, electric charge, and variations in capacitance caused by the diaphragm movements result in variations of the voltage developed across an operating resistor. These variations in voltage are proportional to the movement of the diaphragm. This circuit arrangement is widely used and is referred to as an audio-frequency circuit.

There are difficulties involved in this group of circuit arrangements that are due to the fact that operating resistors having a very high resistance must be used because the capacitance of the microphone is very small. This gives rise to insulation problems and requires means to oppose the inconvenient phenomena which are due to the high resistance of the control circuits, i.e. the grid circuits of electron tubes.

In the other group of circuit arrangements for condenser microphones, the movement of the diaphragm results in a variation of the capacitance of the transducer, and this variation is transformed into an at least approximately proportional variation of a parameter, e.g., the amplitude, phase or frequency of an auxiliary oscillation signal of high frequency. For this reason, these circuit arrangements are generally referred to as high frequency circuits.

One of the best known circuit arrangements of this kind is the Riegger circuit, in which the variation of the capacitance of the condenser microphone results in a frequency modulation of the high-frequency auxiliary oscillation. When this oscillation is then demodulated by any of the known circuits, an audiofrequency voltage is obtained which corresponds to the signal of the transducer.

In another high frequency circuit, the amplitude of the high frequency oscillation voltage is varied in synchronism with the variations of the capacitance of the transducer. This arrangement results in a kind of single side band modulation which has no carrier. The carrier then must be reinserted in the detector stage in proper phase. This can only be accomplished by means of special circuits.

In another high-frequency circuit which has been disclosed, a condenser microphone is included in one arm of a bridge and connected in series with a capacitor forming the adjoining arm of the bridge. In this case, the high frequency voltage is applied by means of a transformer, the secondary winding of which consists of two symmetrical halves, which form the two opposite arms of the bridge. The alternating voltage having an audiofrequency modulation is derived from the diagonal of the bridge by means of an audiofrequency transformer, which lies in the diagonal of a diode bridge circuit. The direct current path for this bridge diagonal is closed by a high frequency choke in the diagonal of the high frequency bridge.

The main disadvantage of this circuit arrangement is its low sensitivity. The modulation of the high frequency oscillations caused by the variations of the capacitance of the condenser microphone when exposed to sound is very small so that interfering modulations and the inherent noise of the demodulating circuit result in an unsatisfactory signal-to-noise ratio.

The invention has as its object to improve the circuit arrangement described hereinbefore, particularly in the demodulating part, in order to increase the efficiency of the demodultaion. For this purpose it is proposed, according to the invention, to provide an alternating current by-pass for the rectifier resistor associated with each diode, also for audiofrequency, and to connect the two demodulator diodes in opposition by one or more windings of a transformer so that the primary impedance of this transformer serves as an audiofrequency operating impedance, at which the difference between the demodulated instantaneous voltages of both diodes is effective.

Depending whether a winding having a center tap is selected or two separate windings are provided, a common rectifier resistor, which is by-passed for alternating current, will be obtained for both diodes in the first case, and in the other case each diode will be provided with a separate rectifier resistor, which is by-passed for alternating current, and these resistors carry currents which are due to the ampere-turns of the transformer and flow in mutually opposite directions to the alternating-current zero voltage point of the bridge.

Figure 2:
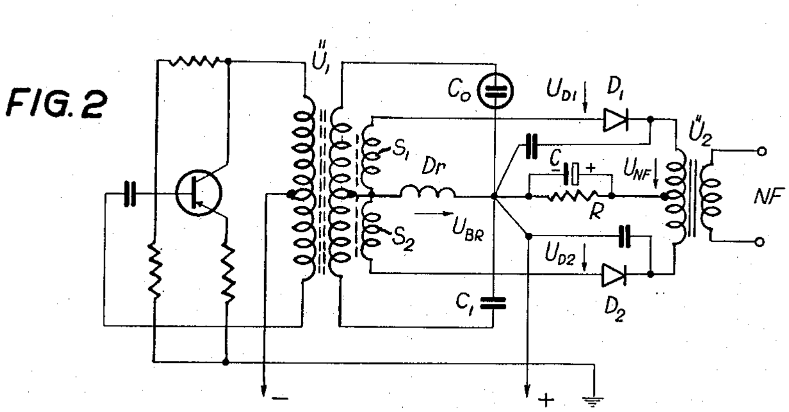
Figure 3:
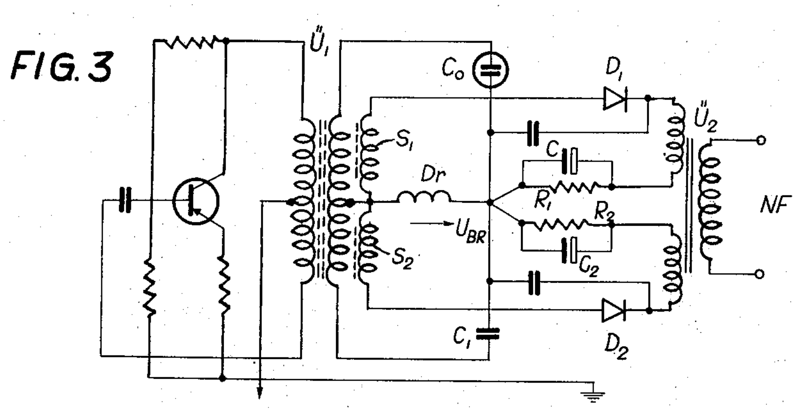

The invention will now be explained more fully with reference to the following specification and drawing, in which FIG. 1 shows the circuit arrangement on which the invention is based and FIGS. 2 and 3 schematically illustrate embodiments of the invention.

In the known circuit arrangement shown in FIG. 1, the diodes $D_1$ and $D_2$ are connected to taps of the input transformer $Ü_1$ and are connected in series for direct current. As will be explained hereinafter with reference to FIGS. 2 and 3, the diodes may be connected by separate windings $S_1$ and $S_2$ in order to achieve an optimum matching. The voltages $U_1$ and $U_2$ are added to the bridge voltage $U_{Br}$. Demodulation is effected as in a ratio detector with the audiofrequency transformer $Ü_2$ acting as an operating resistor and with the resistors $R_1$ and $R_2$ as rectifier resistors.

In this case, the voltages appearing at the diodes are $$(1) \qquad U_{D1}=U_1+U_{Br},\ U_{D2}=-U_1+U_{Br}$$

The demodulated voltage in the zero arm of the diode bridges is developed across the audiofrequency transformer $Ü_2$ and, as is known, is as large as one half of the difference of the absolute values of the diode voltages $$(2) \qquad U_{NF}=\frac{|U_{D1}|-|U_{D2}|}{2}=\frac{|U_1|+|U_{Br}|-(|-U_2|+|U_{Br}|)}{2}$$

If the constant auxiliary voltages $U_1$ and $U_2$ exceed the bridge voltage $|U_{Br}|$, Equation 2 is changed to $U_{NF}=|U_{Br}|$.

This means that the demodulation efficiency of the known circuit arrangement is relatively poor and is further decreased by the fact that the two rectifier resistors $R_1$ and $R_2$, each having a value of about 10 kiloohms, increase the alternating-current resistance of the demodulating bridge. Hence, the rectifiers cannot be made as large as would be desirable to obtain a minimum diode noise.

A much higher efficiency is obtained in the arrangement of the invention, two embodiments of which are exemplified in FIGS. 2 and 3, respectively. This is achieved by means of a transformer $\ddot{U}_2$ that is included as an alternating-current operating impedance element in the circuit of the diodes, which are connected in opposition for direct current, and the rectifier resistor is, or the rectifier resistors are, by-passed for alternating current, including audiofrequency. When other conditions are equal, this measure causes $U_{NF}$ to be equal to 2 $U_{Br}$, i.e., twice as large as in the known circuit. Another advantage which is obtained resides in that there is no audiofrequency voltage drop at the rectifier resistor or resistors because this resistor is, or these resistors are, by-passed for alternating current. Besides, this resistor or these resistors can be given optimum values with respect to the operating point of the diodes.

In the embodiment shown in FIG. 2, the demodulator diodes $D_1$ and $D_2$ are connected in opposition to each other for direct current to one winding of the output transformer $\ddot{U}_2$. This winding has a center tap, to which rectifier resistor R, common to both diodes, is connected. This resistor is by-passed according to the invention by a capacitor C so that the parallel connection constitutes virtually no impedance at the audiofrequencies in question. The rectifier resistor is suitably by-passed by an electrolytic capacitor, which has a small volume and a high capacitance. It is clearly apparent from FIG. 2 that the circuit arrangement according to the invention provides for a separation of the rectifier resistor and the operating impedance so that the alternating current circuit and the direct current circuit can be dimensioned virtually independently of each other.

A higher degree of independence and adjustability is afforded by the circuit arrangement according to the invention shown in FIG. 3. In this arrangement, that winding of the transformer $\ddot{U}_2$ to which the diodes $D_1$ and $D_2$ are connected is divided at its center so that a separate rectifier resistor can be used for each diode. In this embodiment, the operating point of each diode can be adjusted to an optimum. There are two rectifier resistors $R_1$ and $R_2$, each of which is by-passed for alternating current by a capacitor $C_1$ and $C_2$, respectively. The circuit of FIG. 3 will suitably be used only if the characteristic values of the diodes vary so much that a perfect balance cannot be achieved with a single, common rectifier resistor such as is used in the circuit arrangement shown in FIG. 2.

Instead of the condenser microphone, another capacitive transducer may be used as a modulating member in the circuit. Examples of such transducers are capacitive-type pressure responsive signal generators, microphones responsive to sound conducted through solids, extensometers, etc.

What is claimed is:

1. A high frequency circuit arrangement, which comprises an oscillator for generating a high frequency signal, a supply transformer having primary winding means connected to the oscillator output and secondary winding means having a center tap, an inductance element having one end connected to said center tap, a capacitive transducer and a capacitor connected in series across a first section of said secondary winding means, means connecting the other end of said inductance element to the junction of said transducer and said capacitor, a pair of diodes, means for coupling one terminal of each of said diodes to opposite ends, respectively, of a second section of said secondary winding means, an output transformer having first and second primary winding sections, means connecting one end of each of said primary winding sections to the other terminals, respectively, of said pair of diodes, rectifier resistor means connected between the other ends of said primary winding sections and said other end of said inductance element, and capacitor means connected in shunt with said resistor means for bypassing alternating currents in the audio-frequency range, said diodes being connected with opposed polarity.

2. A high frequency circuit arrangement as set forth in claim 1 in which said first section of said secondary winding means comprises a first winding and said second section thereof comprises a second separate winding inductively coupled to said first winding.

3. A high frequency circuit arrangement as set forth in claim 1 in which said other ends of said output transformer primary winding sections are directly connected together, and wherein said rectifier resistor means and said capacitor means comprise a common resistor and a common capacitor, respectively, connected between said other ends of said primary winding sections and said other end of said inductance element.

4. A high frequency circuit arrangement as set forth in claim 1, in which said other ends of said output transformer primary winding sections are electrically separated from each other, and wherein said rectifier resistor means and said capacitor means comprise two resistors and two capacitors, respectively, one each of said resistors and capacitors being connected in pairs between the other end of one of said primary winding sections and the other end of said inductance element.

5. A high frequency circuit arrangement as set forth in claim 1 in which said capacitive transducer is a condenser microphone.

6. A high frequency circuit comprising an oscillator for generating a high frequency signal, a transformer having a primary winding connected to the oscillator output and first and second secondary windings, said second winding having a center tap dividing same into two equal winding sections, a capacitive transducer, a fixed capacitor, means connecting said transducer and said capacitor in series across said first winding to form a bridge circuit therewith, an inductor connected between said center tap and the junction of said transducer and said capacitor, first and second diodes, an output transformer having first and second primary winding sections, a resistor and a second capacitor connected in parallel, means connecting one section of said second secondary winding, said first diode, said first primary winding section, said parallel R-C circuit and said inductor together in a first series circuit, and means connecting the other section of said second secondary winding, said second diode, said second primary winding section, said parallel R-C circuit and said inductor together in a second series circuit, said diodes being oppositely poled and said capacitor having a capacitance such that it presents a low impedance to audio frequency signals.

References Cited

UNITED STATES PATENTS

| | | | |
|---|---|---|---|
| 2,047,726 | 7/1936 | Di Renzo | 332—2 |
| 2,941,075 | 6/1960 | Christian | 329—129 |
| 3,193,773 | 7/1965 | Oglum | 330—10 |
| 3,310,628 | 3/1967 | Cragg | 179—1 |

WILLIAM C. COOPER, *Primary Examiner.*

ROBERT P. TAYLOR, *Assistant Examiner.*